United States Patent
Tsujino et al.

(10) Patent No.: US 11,433,881 B2
(45) Date of Patent: Sep. 6, 2022

(54) PARKING ASSIST SYSTEM

(71) Applicant: HONDA MOTOR CO., LTD., Tokyo (JP)

(72) Inventors: Miki Tsujino, Saitama (JP); Yuki Hara, Saitama (JP); Hiroshi Yamanaka, Saitama (JP); Yasushi Shoda, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 60 days.

(21) Appl. No.: 17/098,646

(22) Filed: Nov. 16, 2020

(65) Prior Publication Data
US 2021/0179080 A1    Jun. 17, 2021

(30) Foreign Application Priority Data
Dec. 13, 2019    (JP) .............................. JP2019-225943

(51) Int. Cl.
*B60Q 1/48*    (2006.01)
*B60W 30/06*    (2006.01)
(Continued)

(52) U.S. Cl.
CPC .............. *B60W 30/06* (2013.01); *B60K 35/00* (2013.01); *B60K 37/06* (2013.01); *B60K 2370/126* (2019.05); *B60K 2370/1434* (2019.05)

(58) Field of Classification Search
CPC ...... B60W 30/06; B60W 10/04; B60W 10/18; B60W 10/20; B60K 35/00; B60K 37/06;
(Continued)

(56) References Cited

U.S. PATENT DOCUMENTS 10,319,233 B2    6/2019    Hayakawa
11,072,367 B2 *  7/2021    Ohtani .................. B62D 6/001
(Continued)

FOREIGN PATENT DOCUMENTS

JP          2018118550 A    8/2018
JP      WO2017068694 A1    9/2018
(Continued)

OTHER PUBLICATIONS

Notice of Reasons for Refusal for Patent Application JP 2019-225943; 8 pp.

*Primary Examiner* — Anh V La
(74) *Attorney, Agent, or Firm* — Armstrong Teasdale LLP

(57) ABSTRACT

A parking assist system includes: a control device configured to control a powertrain, a brake device, and a steering device to autonomously move a vehicle to a target position; a display device; and operation members configured to receive an operation performed by an occupant of the vehicle. The control device is configured to set at least one target position candidate according to a first operation performed on one of the operation members and cause the display device to display the at least one target position candidate, decide the target position from the at least one target position candidate according to a second operation performed on one of the operation members, and execute driving control for autonomously moving the vehicle to the target position according to a third operation performed on one of the operation members, wherein the first operation and the third operation are an identical operation.

9 Claims, 4 Drawing Sheets

(51) Int. Cl.
   *B60K 35/00* (2006.01)
   *B60K 37/06* (2006.01)

(58) Field of Classification Search
   CPC ...... B60K 2370/126; B60K 2370/1434; B60K 2370/173; B60K 2370/175
   USPC .............. 340/932.2, 933, 937, 435, 988
   See application file for complete search history.

(56) References Cited

U.S. PATENT DOCUMENTS

| | | | |
|---|---|---|---|
| 2016/0272244 A1* | 9/2016 | Imai | G08G 1/166 |
| 2018/0208245 A1 | 7/2018 | Mizutani et al. | |
| 2019/0180621 A1* | 6/2019 | Matsuda | B60R 21/00 |
| 2019/0202447 A1* | 7/2019 | Taniguchi | G05D 1/00 |
| 2019/0236954 A1 | 8/2019 | Komura et al. | |
| 2019/0344828 A1* | 11/2019 | Omori | B62D 15/0285 |

FOREIGN PATENT DOCUMENTS

| | | |
|---|---|---|
| JP | 2019133416 A | 8/2019 |
| WO | 2019040714 A1 | 2/2019 |

\* cited by examiner

PARKING ASSIST SYSTEM

TECHNICAL FIELD

The present invention relates to a parking assist system for automatically moving a vehicle from a passage to a parking position or from a parking position to a passage.

BACKGROUND ART

WO2017/068694A1 discloses a parking assist system for executing automatic parking control to autonomously move the vehicle to a target parking position and automatic unparking control to autonomously move the vehicle to a target unparking position. The parking assist system starts the parking assist control when a start switch is operated. In the parking assist control, automatic driving of the vehicle is executed while a momentary-type switch such as a deadman switch is pressed, and the automatic driving is stopped upon release of the pressing of the momentary-type switch.

In the parking assist system according to WO2017/068694A1, it is necessary to continuously press the momentary-type switch to automatically drive the vehicle, and if the finger tip inadvertently moves away from the switch, the automatic parking control is suspended. Also, the user's attention tends to be focused on the switch operation so that the user may pay less attention to the vehicle surroundings. Therefore, it is preferred that the switch for executing the control is easy to operate.

SUMMARY OF THE INVENTION

In view of the foregoing background, an object of the present invention is to provide a parking assist system in which operations to be performed by the user to execute the control are easy.

To achieve the above object, one embodiment of the present invention provides a parking assist system (1) comprising: a control device (15) configured to control a powertrain (4) including a transmission, a brake device (5), and a steering device (6) to autonomously move a vehicle to a target position; a display device (32) configured to display at least one candidate for the target position; and multiple operation members (32, 34, 35) configured to receive an operation performed by an occupant of the vehicle, wherein the control device is configured to set the at least one candidate for the target position according to a first operation performed by the occupant on one of the multiple operation members and cause the display device to display the at least one candidate for the target position, decide the target position from the one or more candidates of the target position according to a second operation performed by the occupant on one of the multiple operation members, and execute driving control for autonomously moving the vehicle to the target position according to a third operation performed by the occupant on one of the multiple operation members, wherein the first operation and the third operation are an identical operation.

According to this configuration, since the third operation for executing the travel control to autonomously move the vehicle to the target position is identical with the first operation for setting at least one candidate for the target position, the operations are easy to perform.

In the above configuration, preferably, the control device is configured to stop the driving control according to a fourth operation performed by the occupant on one of the multiple operation members during execution of the driving control, the third operation and the fourth operation being an identical operation.

According to this configuration, since the fourth operation is the same as the third operation, the user can perform the operation promptly when it is necessary to stop the travel control.

In the above configuration, preferably, the operation member to receive the third operation and the operation member to receive the fourth operation are a same operation member.

According to this configuration, the user can perform the third operation and the fourth operation on the common operation member, and therefore, can perform the operations easily.

In the above configuration, preferably, the operation member to receive the first operation and the operation member to receive the third operation are a same operation member.

According to this configuration, the user can perform the first operation and the third operation on the common operation member, and therefore, can perform the operations easily.

In the above configuration, preferably, the operation member to receive the second operation and the operation member to receive the third operation are different operation members.

According to this configuration, the first operation and the third operation, which are the same operation to be performed on the same operation member, interpose therebetween the second operation which is to be performed on a different operation member. This allows the user to execute the first to third operations while clearly distinguishing them from one another. Namely, an erroneous operation by the user can be prevented.

In the above configuration, preferably, the first operation and the second operation are operations having different operation directions According to this configuration, an erroneous operation by the user can be prevented.

In the above configuration, preferably, the multiple operation members include a push button switch, and the first operation and the third operation are a pressing operation of the push button switch.

According to this configuration, the first operation and the third operation can be made easy.

In the above configuration, preferably, the multiple operation members include a touch panel, and the second operation is a touch operation on the touch panel.

According to this configuration, the second operation can be made distinct from the first operation and the third operation. Thereby, an erroneous operation by the user can be prevented.

In the above configuration, preferably, the multiple operation members include a rotary selector, and the second operation is a rotating operation of the rotary selector.

According to this configuration, the second operation can be made distinct from the first operation and the third operation. Thereby, an erroneous operation by the user can be prevented.

According to the foregoing configuration, it is possible to provide a parking assist system in which operations to be performed by the user to execute the control are easy.

DESCRIPTION OF THE PREFERRED EMBODIMENT(S)

In the following, an embodiment of the present invention will be described in detail with reference to the drawings.

A parking assist system 1 is mounted on a vehicle such as an automobile provided with a vehicle control system 2 configured to make the vehicle travel autonomously.

Figure 1:
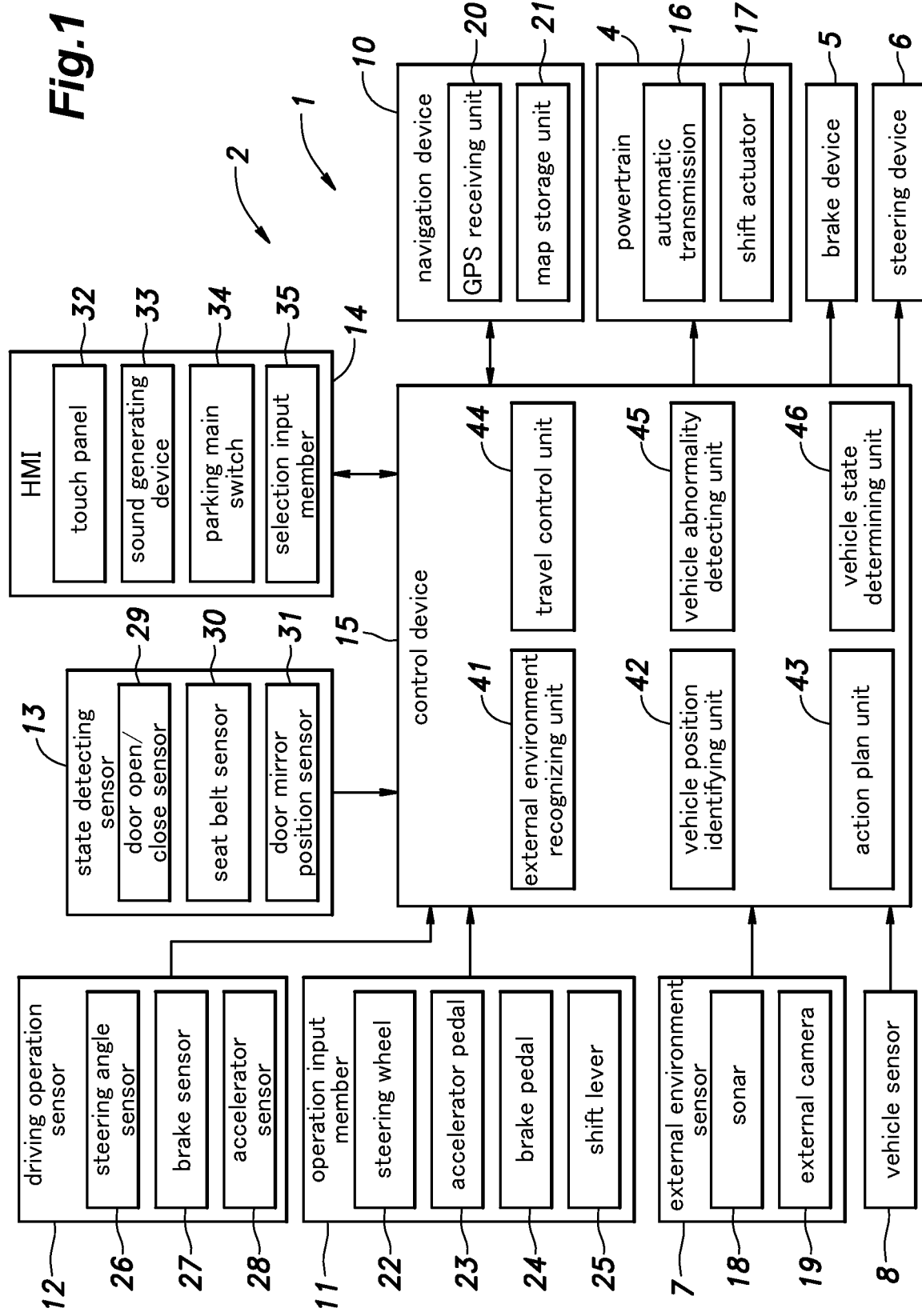
FIG. 1 is a functional configuration diagram of a vehicle in which a parking assist system is installed.

As shown in FIG. 1, the vehicle control system 2 includes a powertrain 4, a brake device 5, a steering device 6, an external environment sensor 7, a vehicle sensor 8, a navigation device 10, an operation input member 11, a driving operation sensor 12, a state detecting sensor 13, a human machine interface (HMI) 14, and a control device 15. The above components of the vehicle control system 2 are connected to each other so that signals can be transmitted therebetween via communication means such as a Controller Area Network (CAN).

The powertrain 4 is a device configured to apply a driving force to the vehicle. The powertrain 4 includes a power source and a transmission, for example. The power source includes at least one of an internal combustion engine, such as a gasoline engine and a diesel engine, and an electric motor. In the present embodiment, the powertrain 4 includes an automatic transmission 16 and a shift actuator 17 for changing a shift position of the automatic transmission 16 (a shift position of the vehicle). The brake device 5 is a device configured to apply a brake force to the vehicle. For example, the brake device 5 includes a brake caliper configured to press a brake pad against a brake rotor and an electric cylinder configured to supply an oil pressure to the brake caliper. The brake device 5 may include an electric parking brake device configured to restrict rotations of wheels via wire cables. The steering device 6 is a device for changing a steering angle of the wheels. For example, the steering device 6 includes a rack-and-pinion mechanism configured to steer (turn) the wheels and an electric motor configured to drive the rack-and-pinion mechanism. The powertrain 4, the brake device 5, and the steering device 6 are controlled by the control device 15.

The external environment sensor 7 serves as an external environment information acquisition device for detecting electromagnetic waves, sound waves, and the like from the surroundings of the vehicle to detect an object outside the vehicle and to acquire surrounding information of the vehicle. The external environment sensor 7 includes sonars 18 and external cameras 19. The external environment sensor 7 may further include a millimeter wave radar and/or a laser lidar. The external environment sensor 7 outputs a detection result to the control device 15.

Each sonar 18 consists of a so-called ultrasonic sensor. Each sonar 18 emits ultrasonic waves to the surroundings of the vehicle and captures the ultrasonic waves reflected by an object around the vehicle thereby to detect a position (distance and direction) of the object. Multiple sonars 18 are provided at each of a rear part and a front part of the vehicle. In the present embodiment, two pairs of sonars 18 are provided on a rear bumper so as to be spaced laterally from each other, two pairs of sonars 18 are provided on a front bumper so as to be spaced laterally from each other, one pair of sonars 18 is provided at a front end portion of the vehicle such that the two sonars 18 forming the pair are provided on left and right side faces of the front end portion of the vehicle, and one pair of sonars 18 is provided at a rear end portion of the vehicle such that the two sonars 18 forming the pair are provided on left and right side faces of the rear end portion of the vehicle. That is, the vehicle is provided with six pairs of sonars 18 in total. The sonars 18 provided on the rear bumper mainly detect positions of objects behind the vehicle. The sonars 18 provided on the front bumper mainly detect positions of objects in front of the vehicle. The sonars 18 provided at the left and right side faces of the front end portion of the vehicle detect positions of objects on left and right outsides of the front end portion of the vehicle, respectively. The sonars 18 provided at the left and right side faces of the rear end portion of the vehicle detect positions of objects on left and right outsides of the rear end portion of the vehicle, respectively.

The external cameras 19 are devices configured to capture images around the vehicle. Each external camera 19 consists of a digital camera using a solid imaging element such as a CCD or a CMOS, for example. The external cameras 19 include a front camera for capturing an image in front of the vehicle and a rear camera for capturing an image to the rear of the vehicle. The external cameras 19 may include a pair of left and right side cameras that are provided in the vicinity of the door mirrors of the vehicle to capture images on left and right sides of the vehicle.

The vehicle sensor 8 includes a vehicle speed sensor configured to detect the speed of the vehicle, an acceleration sensor configured to detect the acceleration of the vehicle, a yaw rate sensor configured to detect the angular velocity around a vertical axis of the vehicle, and a direction sensor configured to detect the direction of the vehicle. For example, the yaw rate sensor consists of a gyro sensor.

The navigation device 10 is a device configured to obtain a current position of the vehicle and provides route guidance to a destination and the like. The navigation device 10 includes a GPS receiving unit 20 and a map storage unit 21. The GPS receiving unit 20 identifies a position (latitude and longitude) of the vehicle based on a signal received from an artificial satellite (positioning satellite). The map storage unit 21 consists of a known storage device such as a flash memory or a hard disk, and stores map information.

The operation input member 11 is provided in a vehicle cabin to receive an input operation performed by the occupant (user) to control the vehicle. The operation input member 11 includes a steering wheel 22, an accelerator pedal 23, a brake pedal 24 (brake input member), and a shift lever 25 (a shift member). The shift lever 25 is configured to receive an operation for selecting the shift position of the vehicle.

The driving operation sensor 12 detects an operation amount of the operation input member 11. The driving operation sensor 12 includes a steering angle sensor 26 configured to detect a steering angle of the steering wheel 22, a brake sensor 27 configured to detect a pressing amount of the brake pedal 24, and an accelerator sensor 28 configured to detect a pressing amount of the accelerator pedal 23. The driving operation sensor 12 outputs a detected operation amount to the control device 15.

The state detecting sensor 13 is a sensor configured to detect a change in a state of the vehicle according to an operation by the occupant. The operation by the occupant detected by the state detecting sensor 13 includes an operation indicating an alighting intention (intention to alight from the vehicle) of the occupant and an operation indicating absence of an intention of the occupant to check the surroundings of the vehicle during an autonomous parking operation or an autonomous unparking operation. The state detecting sensor 13 includes, as sensors for detecting the operation indicating the alighting intention, a door open/close sensor 29 configured to detect opening and/or closing of a door of the vehicle and a seat belt sensor 30 configured to detect a fastening state of a seat belt. The state detecting sensor 13 includes, as a sensor to detect the operation corresponding to the abdicating intention, a door mirror position sensor 31 configured to detect a position of a door mirror. The state detecting sensor 13 outputs a signal indicating a detected change in the state of the vehicle to the control device 15.

The HMI 14 is an input/output device for receiving an input operation by the occupant and notifying the occupant of various kinds of information by display and/or voice. The HMI 14 includes, for example, a touch panel 32 that includes a display screen such as a liquid crystal display or an organic EL display and is configured to receive the input operation by the occupant, a sound generating device 33 such as a buzzer or a speaker, a parking main switch 34, and a selection input member 35. The touch panel 32 and the sound generating device 33 do not have to be devices fixed to the vehicle, and may be realized as a mobile terminal, such as a smartphone or a tablet personal computer (PC), that can be used remote from the vehicle, for example. The parking main switch 34 receives the input operation by the occupant to execute selected one of an automatic parking process (autonomous parking operation) and an automatic unparking process (autonomous unparking operation). The parking main switch 34 is a push button switch configured to receive a pressing operation performed by the occupant. The selection input member 35 receives a selection operation by the occupant related to selection of the automatic parking process and the automatic unparking process. The selection input member 35 may consist of a rotary select switch, which preferably requires pressing as the selection operation.

The control device 15 consists of an electronic control unit (ECU) that includes a CPU, a nonvolatile memory such as a ROM, a volatile memory such as a RAM, and the like. The CPU executes operation processing according to a program so that the control device 15 executes various types of vehicle control. The control device 15 may consist of one piece of hardware, or may consist of a unit including multiple pieces of hardware. Further, the functions of the control device 15 may be at least partially executed by hardware such as an LSI, an ASIC, and an FPGA, or may be executed by a combination of software and hardware.

Further, the control device 15 executes an arithmetic process according to a program and thereby performs a conversion process of an image (video) captured by the external cameras 19 so as to generate a look-down image corresponding to a plan view of the vehicle and its surrounding area and a bird's-eye image corresponding to a three-dimensional image of the vehicle and a part of its surrounding area positioned in the travel direction as viewed from above. The control device 15 may generate the look-down image by combining the images of the front camera, the rear camera, and the left and right side cameras, and may generate the bird's-eye image by combining the image captured by the front camera or the rear camera facing the travel direction and the images captured by the left and right side cameras.

The parking assist system 1 is a system for executing the so-called automatic parking process and the so-called automatic unparking process, in which a vehicle is moved autonomously to a prescribed target position (a target parking position or a target unparking position) selected by the occupant so as to park or unpark the vehicle.

The parking assist system 1 includes: the control device 15; the external environment sensor 7 (the sonar 18 and the external camera 19), which serves as a target position candidate detection device; the touch panel 32, which serves as a display device on which a selection operation can be performed; the external camera 19, which serves as an imaging device; the selection input member 35; and the operation input member 11.

The control device 15 controls the powertrain 4, the brake device 5, and the steering device 6 so as to execute an autonomous parking operation to move the vehicle autonomously to a target parking position and park the vehicle at the target parking position and an autonomous unparking operation to move the vehicle autonomously to a target unparking position and unpark the vehicle at the target unparking position. In order to execute such operations, the control device 15 includes an external environment recognizing unit 41, a vehicle position identifying unit 42, an action plan unit 43, a travel control unit 44, a vehicle abnormality detecting unit 45, and a vehicle state determining unit 46.

The external environment recognizing unit 41 recognizes an obstacle (for example, a parked vehicle or a wall) that is present around the vehicle based on the detection result of the external environment sensor 7, and thereby obtains information about the obstacle. Further, the external environment recognizing unit 41 analyzes the images captured by the external cameras 19 based on a known image analysis method such as pattern matching, and thereby determines whether a wheel stopper or an obstacle is present, and obtains the size of the wheel stopper or the obstacle in a case where the wheel stopper or the obstacle is present. Further, the external environment recognizing unit 41 may compute a distance to the obstacle based on signals from the sonars 18 to obtain the position of the obstacle.

Also, by the analysis of the detection result of the external environment sensor 7 (more specifically, by the analysis of the images captured by the external cameras 19 based on a known image analysis method such as pattern matching), the external environment recognizing unit 41 can acquire, for example, a lane on a road delimited by road signs and a parking space 52 (see FIG. 3) delimited by white lines and the like provided on a surface of a road, a parking lot, and the like.

The vehicle position identifying unit 42 identifies the position of the vehicle (the own vehicle) based on a signal from the GPS receiving unit 20 of the navigation device 10. Further, the vehicle position identifying unit 42 may obtain the vehicle speed and the yaw rate from the vehicle sensor 8, in addition to the signal from the GPS receiving unit 20, and identify the position and posture of the vehicle by the so-called inertial navigation.

The travel control unit 44 controls the powertrain 4, the brake device 5, and the steering device 6 based on a travel control instruction from the action plan unit 43 to make the vehicle travel.

The vehicle abnormality detecting unit 45 detects an abnormality of the vehicle (hereinafter referred to as "vehicle abnormality") based on signals from various devices and sensors. The vehicle abnormality detected by the vehicle abnormality detecting unit 45 includes failure of various devices necessary for driving the vehicle (for example, the powertrain 4, the brake device 5, and the steering device 6) and failure of various sensors necessary for making the vehicle travel autonomously (for example, the external environment sensor 7, the vehicle sensor 8, and the GPS receiving unit 20). Further, the vehicle abnormality includes failure of the HMI 14.

The vehicle state determining unit 46 acquires the state of the vehicle based on signals from various sensors provided in the vehicle, and determines whether the vehicle is in a prohibition state in which the autonomous movement (namely, the autonomous parking operation or the autonomous unparking operation) of the vehicle should be prohibited. The vehicle state determining unit 46 determines that the vehicle is in the prohibition state when the occupant performs a driving operation (override operation) of the operation input member 11. The override operation is an operation to override (cancel) the autonomous movement (namely, the autonomous parking operation or the autonomous unparking operation) of the vehicle.

Further, the vehicle state determining unit 46 determines, based on the detection result of the state detecting sensor 13, that the vehicle is in the prohibition state when the vehicle is in a state that reflects the alighting intention (intention to alight from the vehicle) of the occupant. More specifically, when the door open/close sensor 29 detects that the door is opened, the vehicle state determining unit 46 determines that the vehicle is in the prohibition state. Also, when the seat belt sensor 30 detects that the seat belt is released, the vehicle state determining unit 46 determines that the vehicle is in the prohibition state.

Further, the vehicle state determining unit 46 determines that, based on the detection result of the state detecting sensor 13, that the vehicle is in the prohibition state when the vehicle is in a state that reflects the absence of intention of the occupant to check the surroundings of the vehicle. More specifically, the vehicle state determining unit 46 determines that the vehicle is in the prohibition state when the door mirror position sensor 31 detects that the door mirror is retracted.

The action plan unit 43 starts the automatic parking process (autonomous parking operation) or the automatic unparking process (autonomous unparking operation) according to a first operation performed by the occupant on any one of multiple operation members when the vehicle is in a prescribed state. The multiple operation members include at least two of the touch panel 32, the parking main switch 34, and the selection input member 35. More specifically, the action plan unit 43 starts the automatic parking process in a case where the first operation is detected when the vehicle is stopped or the vehicle is traveling at a low speed equal to or less than a prescribed vehicle speed (a vehicle speed at which a parking position candidate can be searched for). The action plan unit 43 starts the automatic unparking process (parallel unparking process) according to the first operation performed by the occupant on one of the multiple operation members when the vehicle is stopped. The selection of the process to be executed (the automatic parking process or the automatic unparking process) is made by the action plan unit 43 based on the state of the vehicle. When executing the automatic parking process, the action plan unit 43 first makes the touch panel 32 display a parking search screen for setting the target parking position. After the target parking position is set, the action plan unit 43 makes the touch panel 32 display a parking screen. When executing the automatic unparking process, the action plan unit 43 first makes the touch panel 32 display an unparking search screen for setting the target unparking position. After the target unparking position is set, the action plan unit 43 makes the touch panel 32 display an unparking screen.

In the following, the automatic parking process will be described with reference to FIG. 2. The action plan unit 43 first executes an acquisition process (step ST1) to acquire one or more parking spaces, if any. More specifically, in a case where the vehicle is stopped, the action plan unit 43 first makes the touch panel 32 of the HMI 14 display a notification that instructs the occupant to move the vehicle straight. While the occupant sitting in the driver's seat (hereinafter referred to as "driver") is moving the vehicle straight, the external environment recognizing unit 41 acquires, based on a signal from the external environment sensor 7, a position and size of each detected obstacle and positions of the white lines provided on the road surface. The external environment recognizing unit 41 extracts, based on the acquired position and size of the obstacle and the acquired positions of the white lines, one or more undelimited parking spaces and one or more delimited parking spaces, if any (hereinafter, the undelimited parking spaces and the delimited parking spaces will be collectively referred to as "parking spaces"). Each undelimited parking space is a space that is not delimited by the white lines or the like, has a size sufficient to park the vehicle, and is available (namely, there is no obstacle therein). Each delimited parking space is a space that is delimited by the white lines or the like, has a size sufficient to park the vehicle, and is available (namely, another vehicle (vehicle other than the own vehicle) is not parked).

Next, the action plan unit 43 executes a trajectory calculation process (step ST2) to calculate a trajectory of the vehicle from a current position of the vehicle to each extracted parking space. In a case where the trajectory of the vehicle can be calculated for a certain parking space, the action plan unit 43 sets the parking space as a parking position candidate where the vehicle can be parked, and make the touch panel 32 display the parking position candidate on the screen (the parking search screen). In a case where the trajectory of the vehicle cannot be calculated due to the presence of the obstacle, the action plan unit 43 does not set the parking space as a parking position candidate and does not make the touch panel 32 display the parking space on the screen. When the action plan unit 43 sets multiple parking position candidates (namely, multiple parking places for which the trajectory of the vehicle can be calculated), the action plan unit 43 makes the touch panel 32 display these parking position candidates. Thus, by the above process of steps ST1 and ST2, which is performed according to the first operation performed by the occupant on one of the multiple operation members, at least one parking position candidate (candidate for the target position) is set and displayed on the touch panel 32 serving as a display device.

Next, the action plan unit 43 executes a target parking position reception process (step ST3) to receive a selection operation performed by the occupant to select the target parking position, which is a parking position where the occupant wants to park the vehicle, and is selected from the one or more parking position candidates displayed on the touch panel 32. More specifically, the action plan unit 43 makes the touch panel 32 display the look-down image and the bird's-eye image in the travel direction on the parking search screen shown in FIG. 3A. When the action plan unit 43 acquires at least one parking position candidate, the action plan unit 43 makes the touch panel 32 display a frame that indicates the parking position candidate and an icon 55 that corresponds to the frame in at least one of the look-down image and the bird's-eye image (in the look-down image in FIG. 3A) in an overlapping manner. The icon 55 consists of a symbol indicating the parking position candidate (see "P" in FIG. 3A). Also, the action plan unit 43 makes the touch panel 32 display the parking search screen including a notification that instructs the driver to stop the vehicle and select the target parking position, so that the touch panel 32 receives a second operation corresponding to the selection operation of the target parking position. The second operation, which is the selection operation of the target parking position, may be performed via the touch panel 32, or may be performed via the selection input member 35.

The action plan unit 43 determines whether the second operation by the occupant is detected based on the signal from the touch panel 32 or the selection input member 35 (ST4). In the case where the second operation is detected, the action plan unit 43 decides a single target parking position (target position) from the parking position candidates (candidates for the target position) according to the second operation performed by the occupant (ST5). Upon deciding the target parking position, the action plan unit 43 makes the touch panel 32 switch the screen from the parking search screen to the parking screen. As shown in FIG. 3B, the parking screen is a screen in which an image in the travel direction of the vehicle (hereinafter referred to as "travel direction image") is displayed on the left half of the touch panel 32 and the look-down image including the vehicle and its surrounding area is displayed on the right half thereof. At this time, the action plan unit 43 may make the touch panel 32 display a thick frame that indicates the target parking position selected from the parking position candidates and an icon 55 that corresponds to the thick frame such that the thick frame and the icon 55 overlap with the look-down image. This icon 55 consists of a symbol indicating the target parking position, and is shown in a color different from the symbol indicating the parking position candidate. Then, the action plan unit 43 may cause the touch panel 32 and/or the sound generating device 33 to output a notification to prompt the occupant to perform a third operation on a prescribed operation member. The third operation may be a prescribed operation on one of the multiple operation members including the parking main switch 34, the touch panel 32, and the selection input member 35.

If the second operation is not detected for a prescribed period in step ST4 (No in ST4), the action plan unit 43 ends the automatic parking control.

The action plan unit 43 determines whether the third operation by the occupant is detected (ST6), and when the third operation is detected, the action plan unit 43 executes a driving process (step ST7) to make the vehicle move to the target parking position along the calculated trajectory. At this time, the action plan unit 43 controls the vehicle based on the position of the vehicle acquired by the GPS receiving unit 20 and the signals from the external cameras 19, the vehicle sensor 8, and the like so that the vehicle travels along the calculated trajectory. At this time, the action plan unit 43 controls the powertrain 4, the brake device 5, and the steering device 6 so as to execute a switching operation for switching the travel direction of the vehicle (a reversing operation for reversing the travel direction of the vehicle).

The switching operation may be executed repeatedly, or may be executed only once. If the third operation is not detected within a prescribed period in step ST6 (No in ST6), the action plan unit 43 ends the automatic parking control.

During the driving process, the action plan unit 43 may acquire the travel direction image from the external cameras 19 and make the touch panel 32 display the acquired travel direction image on the left half thereof. For example, as shown in FIG. 3B, when the vehicle is moving backward, the action plan unit 43 may make the touch panel 32 display an image to the rear of the vehicle captured by the external cameras 19 on the left half thereof. While the action plan unit 43 is executing the driving process, the surrounding image of the vehicle (the own vehicle) in the look-down image displayed on the right half of the touch panel 32 changes along with the movement of the vehicle.

During the driving process, the vehicle state determining unit 46 determines whether the vehicle is in the prohibition state (ST8). In the case where the vehicle is in the prohibition state (Yes in ST8), the action plan unit 43 executes a suspension process (ST9). In the suspension process, the action plan unit 43 makes the touch panel 32 display a notification that the automatic parking will be suspended or canceled, and decelerates the vehicle to stop the same. The vehicle state determining unit 46 determines that the vehicle is in the prohibition state when at least one of the following conditions is satisfied: (1) the occupant operates the operation input member 11, (2) the external environment recognizing unit 41 detects an obstacle, and (3) a fourth operation by the occupant on a prescribed operation member is detected.

The action plan unit 43 determines whether a fifth operation performed by the occupant on a prescribed operation member is detected within a prescribed period from the start of the suspension process (ST10). In the case where the fifth operation is detected (Yes in ST10), the action plan unit 43 resumes the driving process (ST7). If the fifth operation is not detected within the prescribed period in step ST10 (No in ST10), the action plan unit 43 ends the automatic parking control.

In the case where the vehicle is not in the prohibition state (No in ST8), the action plan unit 43 continues the driving process. When the vehicle reaches the target parking position, the action plan unit 43 stops the vehicle and ends the driving process.

When the driving process ends, the action plan unit 43 executes a parking process (step ST11). In the parking process, the action plan unit 43 first drives the shift actuator 17 to set the shift position (shift range) to a parking position (parking range).

Thereafter, the action plan unit 43 drives the parking brake device, and makes the touch panel 32 display a pop-up window (see FIG. 3C) indicating that the automatic parking of the vehicle has been completed. The pop-up window may be displayed on the screen of the touch panel 32 for a prescribed period. Thereafter, the action plan unit 43 may make the touch panel 32 switch the screen to an operation screen of the navigation device 10 or a map screen.

In the parking process, there may be a case where the shift position cannot be changed to the parking position because of an abnormality of the shift actuator 17 or a case where the parking brake device cannot be driven because of an abnormality of the parking brake device. In these cases, the action plan unit 43 may make the touch panel 32 display the cause of the abnormality on the screen thereof.

Figure 2:
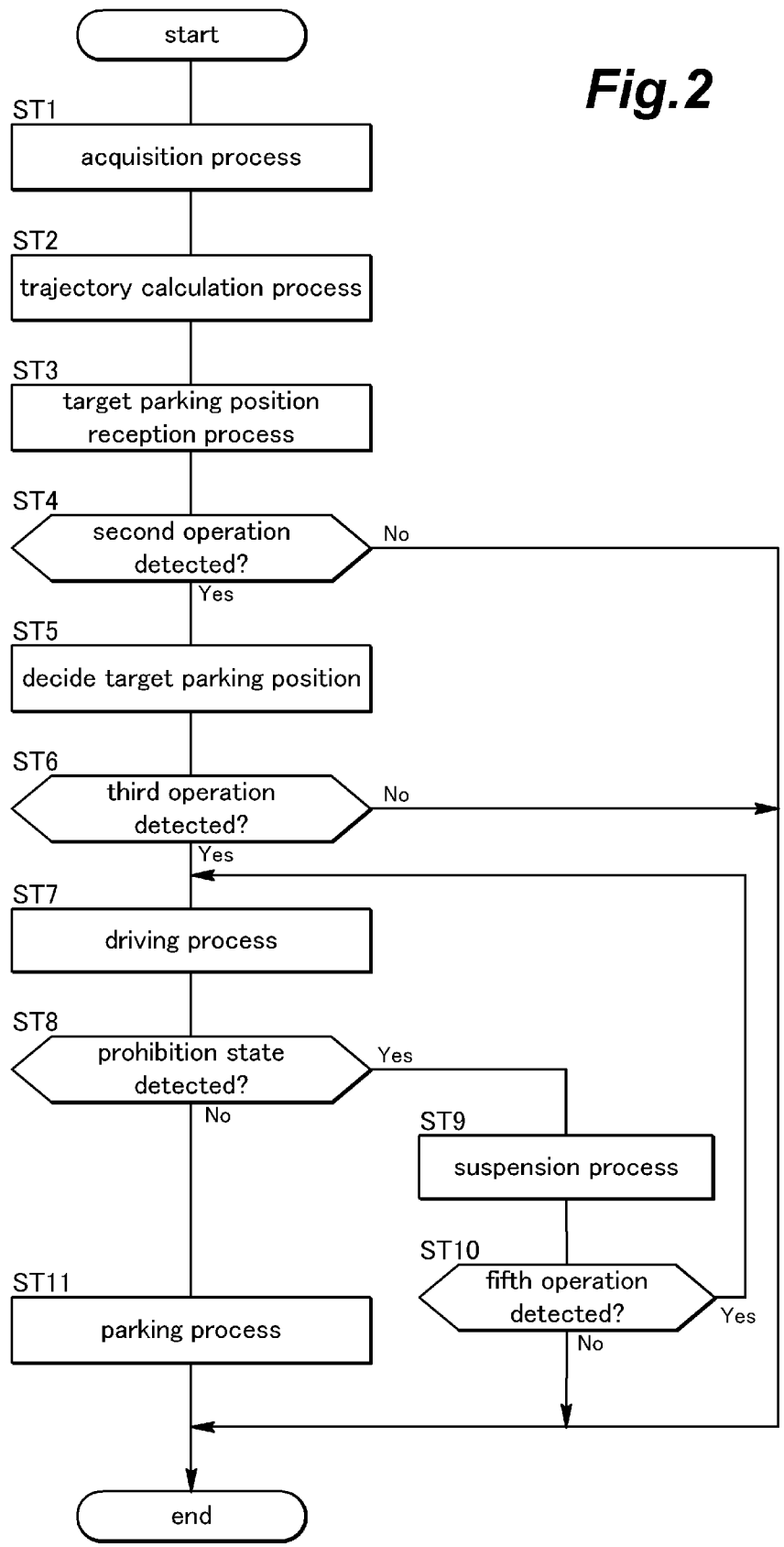
FIG. 2 is a flowchart of an automatic parking process.

The action plan unit 43 executes the automatic unparking process in a manner similar to the automatic parking process shown in FIG. 2. In the automatic unparking process, the target parking position in the automatic parking process is replaced with the target unparking position. Also, in the automatic unparking process, the parking process in ST11 may be omitted. The action plan unit 43 starts the automatic unparking process according to the first operation performed by the occupant on one of the multiple operation members when the vehicle is in a prescribed state.

The first to fifth operations performed by the occupant in the automatic parking process and the automatic unparking process described above will now be described in detail. The occupant performs the first operation on a prescribed operation member when the automatic parking process or the automatic unparking process is to be started. According to the first operation performed by the occupant on the prescribed operation member, the action plan unit 43 starts the automatic parking process or the automatic unparking process, and causes the touch panel 32, which serves as a display device, to display the candidates for the target position (the target parking position or the target unparking position). The occupant performs the second operation on a prescribed operation member to select a single target position from the candidates for the target position. According to the second operation performed by the occupant on the prescribed operation member, the action plan unit 43 decides the single target position from the candidates for the target position. After performing the second operation, the occupant performs the third operation on a prescribed operation member to move the vehicle to the target position. According to the third operation performed by the occupant on the prescribed operation member, the action plan unit 43 executes the driving control to autonomously move the vehicle to the target position.

Figure 4:
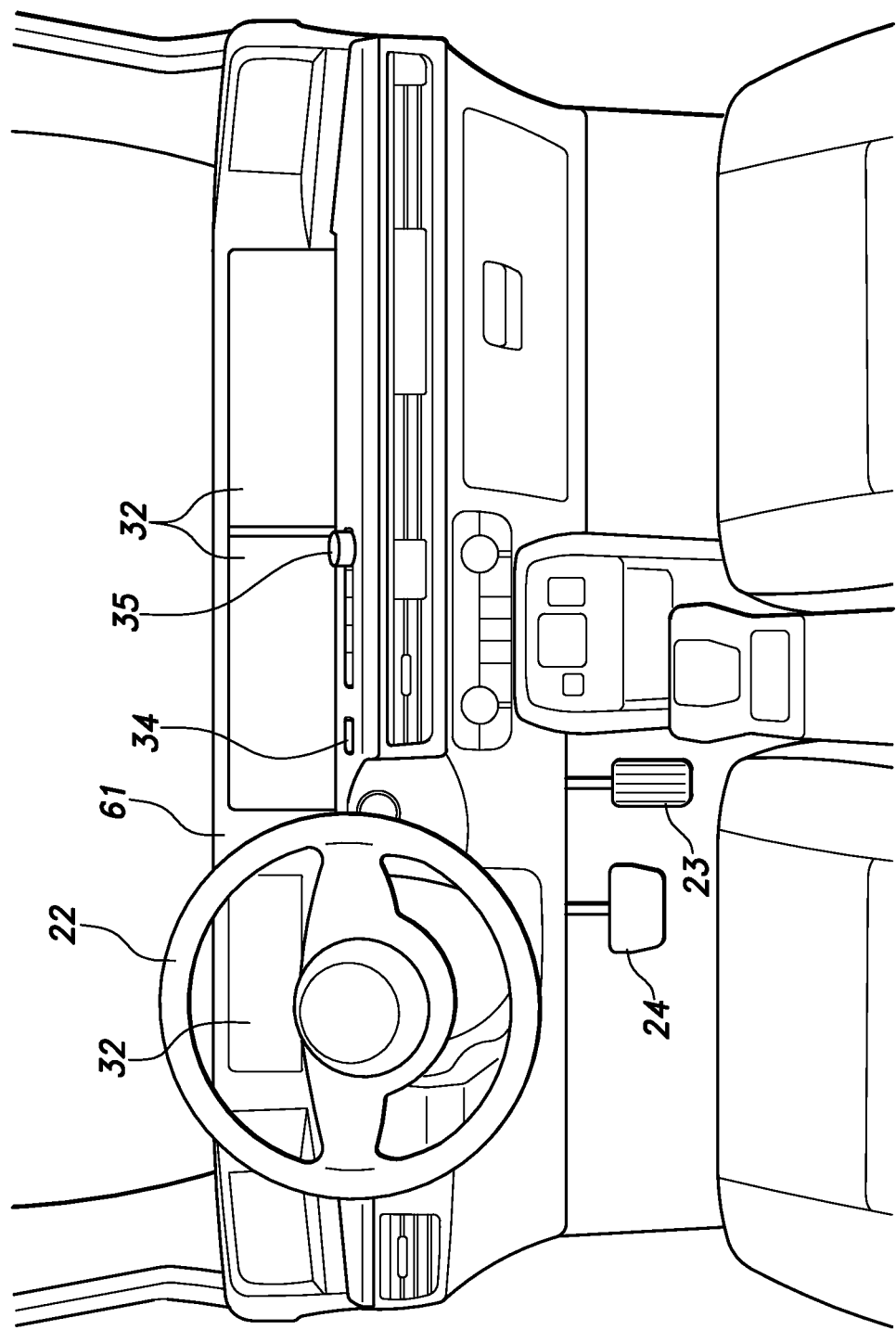
FIG. 4 is an explanatory diagram showing a dash panel.

The operation members on which the first to third operations are to be performed by the occupant include at least one of the parking main switch 34, the selection input member 35, and the touch panel 32. In the present embodiment, the operation member to receive the first operation by the occupant is the parking main switch 34. The parking main switch 34 is preferably provided on a dash panel 61 of the vehicle. Specifically, in the preferred embodiment shown in FIG. 4, the parking main switch 34 is provided on a part of the dash panel 61 to the side of the steering wheel 22. Further, the touch panel 32 is installed in an upper part of the dash panel 61, and the parking main switch 34 is arranged at a position below the touch panel 32. The parking main switch 34 may be a momentary-type switch, for example. The first operation may be a pressing operation of the parking main switch 34. The pressing operation serving as the first operation is an operation performed for a short period, and does not take a long time (for example, one second or longer).

Figure 3A:
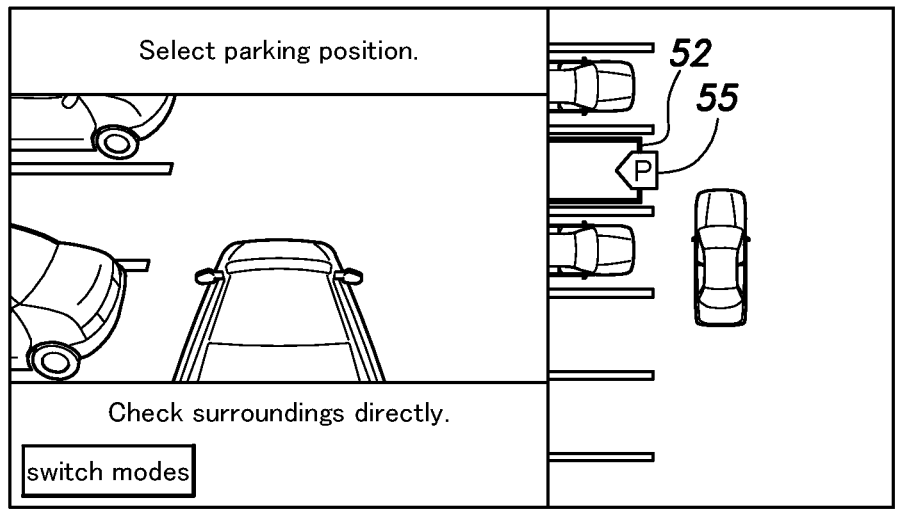
FIG. 3A is a diagram showing a screen display of a touch panel during a target parking position reception process in the parking assist system.
Figure 3B:
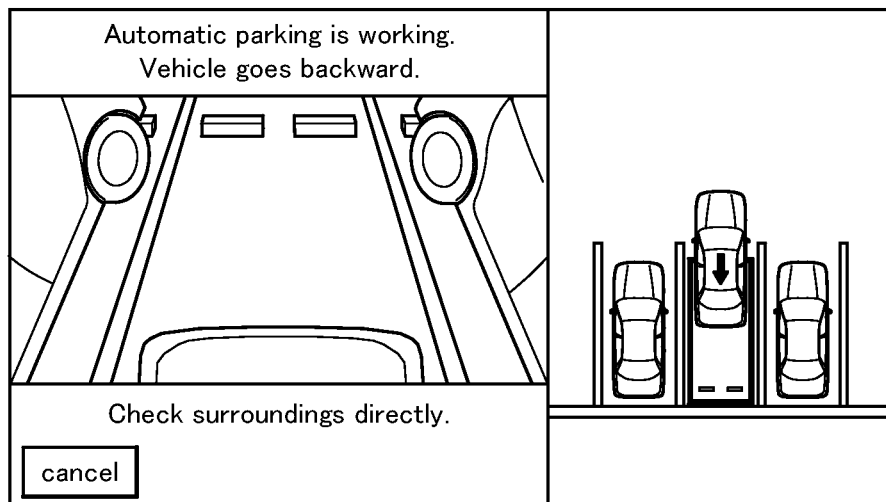
FIG. 3B is a diagram showing the screen display of the touch panel during a driving process in the parking assist system.
Figure 3C:
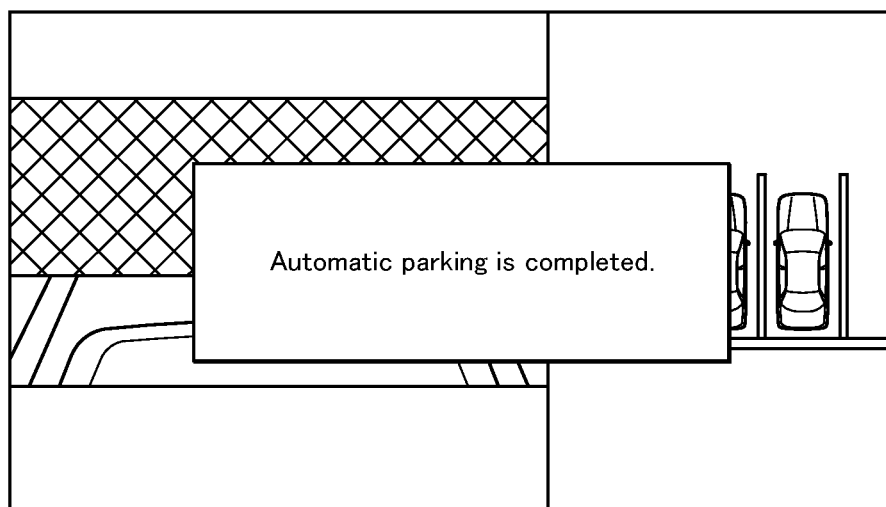
FIG. 3C is a diagram showing the screen display of the touch panel when automatic parking is completed in the parking assist system.

Preferably, the operation member to receive the second operation by the occupant is the touch panel 32, and the second operation is a touch operation on the touch panel 32 (for example, a touch operation on the icon 55 displayed on the touch panel 32, as shown in FIG. 3A). Alternatively or in addition, the operation member to receive the second operation by the occupant may be the selection input member 35. The selection input member 35 may be a rotary selector, for example. The occupant may select the icon 55 as shown in FIG. 3A by a rotating operation of the selection input member 35. The selection input member 35 is preferably provided on the dash panel 61. For example, the selection input member 35 may be arranged on a part of the dash panel 61 to the side of the parking main switch 34.

The operation member to receive the third operation by the occupant includes at least one of the parking main switch 34, the selection input member 35, and the touch panel 32. Preferably, the operation member to receive the first operation and the operation member to receive the third operation are the same operation member. In the present embodiment, the operation member to receive the third operation by the occupant is the parking main switch 34, and the third operation is a pressing operation of the parking main switch 34. The first operation and the third operation are an identical operation, which, in the present embodiment, is a pressing operation of the parking main switch 34.

In the present embodiment, the occupant can cause the action plan unit 43 to execute the automatic parking process or the automatic unparking process by performing three operations, that is, the first operation, the second operation, and the third operation, and therefore, the operations are easy. In addition, while the action plan unit 43 is executing the driving process, the occupant does not need to perform any operation, and therefore, can concentrate on monitoring of the surrounding. Also, of the three operations, the first operation and the third operation are an identical operation to be performed on the same operation member (the parking main switch 34), and this also contributes to making the operations easy to perform.

Further, the operation member to receive the second operation and the operation member to receive the third operation are different operation members, and the operation member to receive the second operation and the operation member to receive the first operation are different operation members. As a result, the first operation and the third operation, which are the same operation to be performed on the same operation member, interpose therebetween the second operation which is to be performed on a different operation member. This allows the user to perform the first to third operations while clearly distinguishing them from one another. Namely, an erroneous operation by the user can be prevented. Also preferably, the first operation and the second operation are operations having different operation directions, and the third operation and the second operation are operations having different operation directions. In the case where the second operation is a rotating operation of the selection input member 35 embodied as a rotary selector, and the first operation and the third operation are each a pressing operation of the parking main switch 34, the second operation can be an operation having an operation direction different from the operation direction of the first and third operations. This allows the occupant to recognize the second operation distinctly from the first and third operations, so that an erroneous operation can be prevented. In the case where the second operation is a touch operation on the touch panel 32, the second operation can be made distinct from the first operation and the third operation. Thereby, an erroneous operation by the user can be prevented.

The operation member to receive the fourth operation by the occupant includes at least one of the parking main switch 34, the selection input member 35, and the touch panel 32. The operation member to receive the fourth operation and the operation member to receive the third operation are preferably the same operation member. In the present embodiment, the operation member to receive the fourth operation is the parking main switch 34, and the fourth operation is a pressing operation of the parking main switch 34. Since the third operation for starting the driving process and the fourth operation for suspending the driving process are an identical operation to be performed on the same operation member, the occupant can promptly perform the fourth operation when, during execution of the driving process, the user desires to suspend the driving process.

The operation member to receive the fifth operation by the occupant includes at least one of the parking main switch 34, the selection input member 35, and the touch panel 32. The operation member to receive the fifth operation and the operation member to receive the fourth operation are preferably different operation members. For example, in a case where the fourth operation is a pressing operation of the parking main switch 34, it is preferable if the fifth operation is a touch operation on the touch panel 32.

Concrete embodiments of the present invention have been described in the foregoing, but various modifications and alterations are possible without being limited by the above-described embodiments. For example, the first operation and the third operation may be a touch operation or a swiping operation on the touch panel 32, and the second operation may be a rotating operation of the selection input member 35.

The control device 15 may preferably detect the first operation for starting the automatic parking process or the automatic unparking process at a timing of pressing down the parking main switch 34 (start point of the operation). Thereby, the action plan unit 43 can execute the acquisition process (ST1), the trajectory calculation process (ST2), and the target parking position reception process (ST3) to thereby display the delimited parking spaces on the touch panel 32 promptly. The control device 15 may preferably detect the third operation for starting the driving process at a timing of releasing the pressing of the parking main switch 34 (end point of the operation). Since the third operation is an operation upon which vehicle control is transferred from the occupant to the vehicle (parking assist system), it is preferred that the action plan unit 43 starts the process after the operation by the occupant was certainly performed. Also, the control device 15 may preferably detect the fourth operation for suspending the driving process at a timing of the start point of the operation on the touch panel 32 or the selection input member 35. Since the fourth operation may be performed in emergency, it is preferred that the action plan unit 43 executes the suspension process promptly.

The invention claimed is:

1. A parking assist system, comprising:
    a control device configured to execute an automatic parking process controlling a powertrain including a transmission, a brake device, and a steering device to autonomously move a vehicle to a target position;
    a display device configured to display at least one candidate for the target position; and
    multiple operation members configured to receive an operation performed by an occupant of the vehicle,
    wherein the control device is configured to:
        start the automatic parking process according to a first operation performed by the occupant on one of the multiple operation members,
        set the at least one candidate for the target position and cause the display device to display the at least one candidate for the target position,
        decide the target position from the at least one candidate of the target position according to a second operation performed by the occupant on one of the multiple operation members when at least one parking position candidate is displayed on the display device, and make the display device display a parking screen including an image in the travel direction of the vehicle and output a notification to prompt the occupant to perform a third operation on one of the multiple operation members,
        end the automatic parking control if the second operation is not detected for a prescribed period, and
        execute driving control for autonomously moving the vehicle to the target position according to the third operation performed by the occupant on one of the multiple operation members when the parking screen is displayed on the display device,
    wherein the first operation and the third operation are an identical operation.

2. The parking assist system according to claim 1, wherein the control device is configured to stop the driving control according to a fourth operation performed by the occupant on one of the multiple operation members during execution of the driving control,
    the third operation and the fourth operation being an identical operation.

3. The parking assist system according to claim 2, wherein the operation member to receive the third operation and the operation member to receive the fourth operation are a same operation member.

4. The parking assist system according to claim 1, wherein the operation member to receive the first operation and the operation member to receive the third operation are a same operation member.

5. The parking assist system according to claim 1, wherein the operation member to receive the second operation and the operation member to receive the third operation are different operation members.

6. The parking assist system according to claim 1, wherein the first operation and the second operation are operations having different operation directions.

7. The parking assist system according to claim 1, wherein the multiple operation members include a push button switch, and
    the first operation and the third operation are a pressing operation of the push button switch.

8. The parking assist system according to claim 1, wherein the multiple operation members include a touch panel, and
    the second operation is a touch operation on the touch panel.

9. The parking assist system according to claim 1, wherein the multiple operation members include a rotary selector, and the second operation is a rotating operation of the rotary selector.

* * * * *